May 20, 1969 R. W. CAMPBELL ET AL 3,445,694
VIBRATION DAMPENER FOR DYNAMOELECTRIC
MACHINE CLAW-TOOTH ROTORS
Filed May 29, 1967

INVENTORS
Robert W. Campbell &
BY Arza D. Heiny

Robert W. Smith
ATTORNEY

3,445,694
VIBRATION DAMPENER FOR DYNAMOELECTRIC MACHINE CLAW-TOOTH ROTORS
Robert W. Campbell, Anderson, and Arza D. Heiny, Carmel, Ind., assignors to General Motors Corporation, Detroit, Mich., a corporation of Delaware
Filed May 29, 1967, Ser. No. 641,933
Int. Cl. H02k 5/24
U.S. Cl. 310—51                                    6 Claims

---

ABSTRACT OF THE DISCLOSURE

A vibration dampener is provided for the claw-tooth rotor of a dynamoelectric machine which includes a pair of rotor poles with interleaved fingers. The pole finger pairs are provided with tip extensions for receiving a pair of continuous wire bands that are formed alternately over each tip and under an adjacent pole finger.

---

This invention relates to rotors for dynamoelectric machines such as alternating current generators and more particularly to a rotor that has a vibration dampener formed of a non-magnetic material.

In rotors for dynamoelectric machines having interleaved fingers it has been found desirable to suppress noise and vibration by use of non-magnetic spacers or annular members secured to the pole fingers. This invention is an improvement of the noise suppressor ring described in Patent 3,252,025 to Brown et al., issued May 17, 1966, assigned to the assignee of this invention. In the aforementioned patent a ring of non-magnetic metal is press-fitted to the inner surfaces of the interleaved pole fingers of an alternating current generator. The alternating current generator described is designed primarly for use in automotive vehicles. The generator is driven as an accesory from a vehicle engine and is driven to speeds of 5000 to 6000 revolutions per minute. To improve generator characteristics and efficiency it is desirable to increase the generator speed. Increasing the speed to a range of 10,000 to 20,000 r.p.m. causes serious vibration and noise which is difficult to suppress in the rotors having interleaved fingers.

An improved vibration dampener is provided in this invention for rotors having a pair of pole members with axially extending interleaved pole fingers. Wire bands extend over a tip portion projecting from the end of each pole finger under an adjacent pole finger. Two wire bands are used which cooperatively restrain the pole fingers from both inward and outward radial deflections so that vibrations are suppressed. The bands are easily installed during mass assembly of the rotor structure and become integral with the rotor.

One object of this invention is to provide a rotor that is comprised of two pole members that are secured to a shaft and have axially extending and interleaved fingers with the inner and outer finger surfaces engaged by a pair of continuous bands of a non-magnetic material.

A further object of this invention is to provide a rotor of the type described wherein the wire bands are spaced apart and alternately engage interleaved pole fingers along both inner and outer circumferential pole finger surfaces to stress the finger radially outward and inward.

Another object of this invention is to provide a rotor of the type described wherein the fingers of the pole members have an inner inclined surface and an axially extending pole tip extension so that a pair of wire bands may be wedged over the tip extensions and under an adjacent pole finger to facilitate installation and also stress the bands against the fingers both radially inwardly and outwardly to substantially reduce vibrations at higher rotor speeds.

Further objects and advantages of the present invention will be apparent from the following description, reference being had to the accompanying drawings wherein a preferred embodiment of the present invention is clearly shown.

Figure 1:
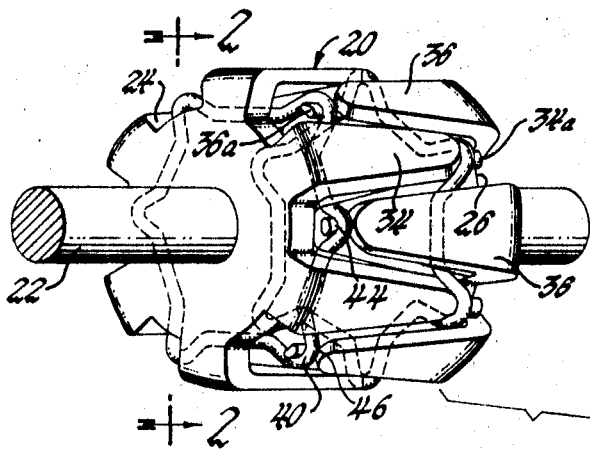
FIGURE 1 is a perspective view of a dynamoelectric machine including a stator and a rotor made in accordance with this invention.
Figure 1:
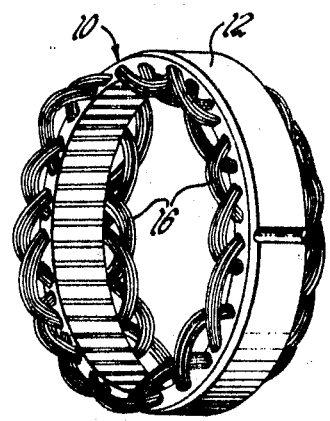

Referring now to the drawings and more particularly to FIGURE 1, the reference numeral 10 designates a stator assembly including steel stator laminations 12. The stator laminations 12 include slots that receive three phase wye-connected stator windings 16. The reference numeral 20 designates the claw-tooth rotor assembly including a shaft 22 and pole members 24 and 26. The pole members are formed of a magnetic material such as steel and are press-fitted to the shaft 22. The stator and rotor assemblies are supported in a frame assembly described in detail in the aforementioned Patent 3,252,025 to Brown et al., issued May 17, 1966, assigned to the assignee of this application.

Figure 2:
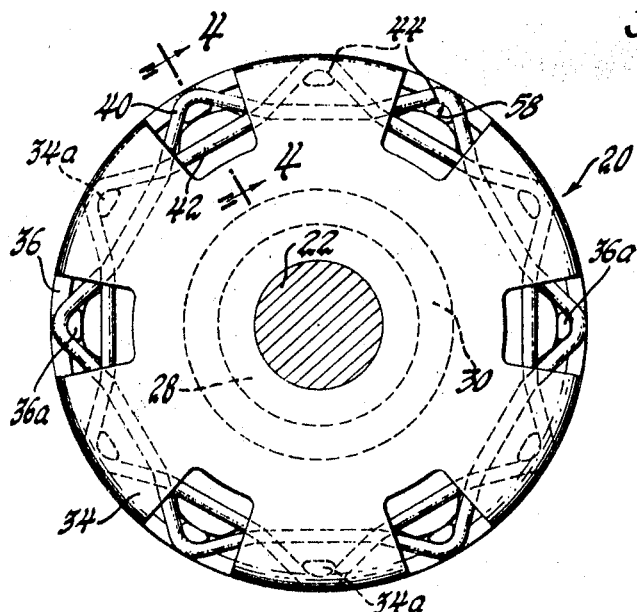
FIGURE 2 is an end view of the rotor of the dynamoelectric machine illustrated in FIGURE 1 looking in the direction of arrows 2—2.

The rotor assembly 20 includes in addition to the shaft 22 and pole members 24 and 26 a core member secured to the shaft between the pole members. The core member is formed of a magnetic material and is illustrated in FIGURE 2 by the area 28 enclosing the shaft 22. The core member, in turn, supports a field coil winding indicated within area 30 enclosed by the concentric dashed lines.

Rotor pole members 24 and 26 each include axially extending pole fingers 34 and 36 respectively. The pole fingers 34 and 36 are alternately interleaved in spaced relationship and form alternate polarity poles when the field coil is excited by a direct current source. Each of the pole fingers respectively includes extending tip portions 34a and 36a having a thickness reduced from that of the main finger portion, as illustrated in FIGURE 4.

A pair of vibration dampener bands 40 and 42 alternately engage the inner and outer peripheries of the fingers 36 and 34 respectively along an inner circumferential finger portion and on top of an adjacent tip portion. In a preferred embodiment the bands are formed by a non-magnetic wire material, for example stainless steel wire having a diameter of .094 inch. The wire is cut to a suitable length and the ends are butt welded. Alternatively, bands are formed by rings cut from seamless non-magnetic tubing having a suitable diameter.

Figure 3:
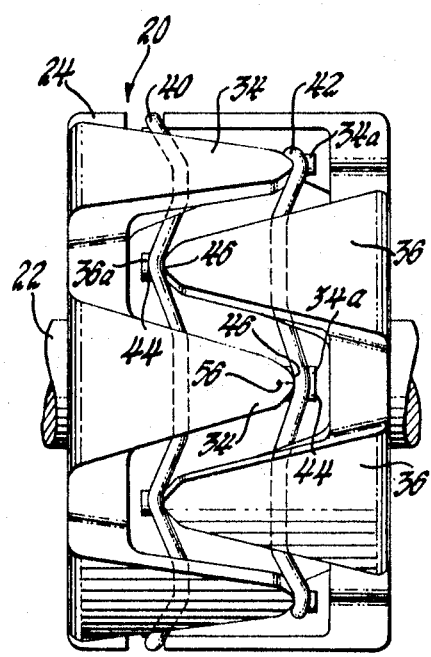
FIGURE 3 is an elevational view of the rotor of the dynamoelectric machine illustrated in FIGURE 1.
Figure 4:
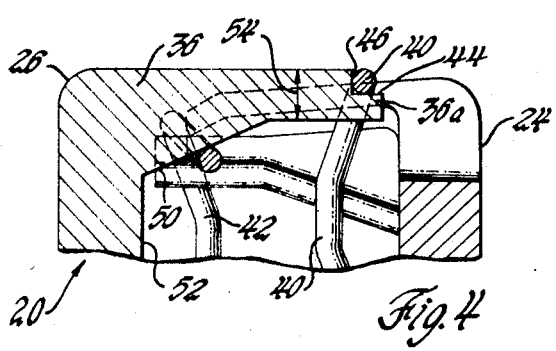
FIGURE 4 is a sectional view of FIGURE 2 looking in the direction of arrows 4—4.

A sectional view of one of the pole fingers 36 is illustrated in detail in FIGURE 4. A finger extending portion 36a projects from the lower portion of the finger 36 providing a recess or step portion for receiving a wire band. The extending tips are provided on each of the pole fingers and are designated 34a and 36a respectively. Each of the tip extensions 34a and 36a have an arcuate circumferential surface 44, as illustrated in FIGURE 2, and the pole finger ends 46 are also arcuate as illustrated in FIGURE 3. As each band extends over a tip extension portion it is cammed around the arcuate finger end 46 and bends over the tip surface 44. Each band runs under an inner finger surface including an inclined portion 50.

In a preferred embodiment the outer diameter of the rotor pole members is 4.08 inches and the length of each finger from the inner pole surface 52 to the end 46 is 1.014 inches. The thickness 54 of each finger is 0.23 inch and the maximum thickness of the arcuate tip portion 0.12 inch. The tip extension portions 34a and 36a extend .115 to .135 inch beyond the end 46 of each pole finger 34 or 36. The radius 56 of the arcuate ends 46 is 0.12 inch. Circumferential tip surface 44 has a radius 58 of 0.12 inch also and the inner inclined surface portions 50 extend at an angle of 116° to the pole end surfaces 52.

When assembling the rotor of the dynamoelectric machine vibration dampener bands 40 and 42 are each placed within the finger portions and toward the pole end surfaces 52 of each pole member 24 and 26 respectively. The pole members are then pressed toward one another on the shaft 22 and the pole tips 34a and 36a are guided under the respective bands 42 and 40. The bands are stressed by tightening over the tip surface 44 and around the finger ends 46. The wires cam on the inner pole inclined surface 50 thereby wedging the wire bands in their spaced relationship and are thus held in place when the pole members 24 and 26 are secured to the shaft. Accordingly, the pole fingers 34 and 36 are stresed radially inwardly at the tip portions and tend to be stressed radially outwardly at the inner inclined finger portion 50. It is contemplated that the bands can be welded to the fingers, for example at the tip portions, although it can be seen that disassembly of the welded bands is difficult.

With the vibration dampener mounted in accordance with this invention and the rotor operated at high speeds in a range of 10,000 to 20,000 revolutions per minute, centrifugal and magnetic forces are counteracted by bands 40 and 42. The bands rotate with the pole fingers 34 and 36 and cooperatively restrain vibration and noise produced in the fingers.

While the embodiment of the present invention as herein disclosed constitutes a preferred form, it is to be understood that other forms might be adopted.

We claim:

1. A dynamoelectric machine comprising, a rotor shaft, first and second pole members having axially extending interleaved pole fingers, said first and second pole members being supported by and rotatable with said shaft, and band means of a non-magnetic material alternately engaging the outer and inner surfaces of said axially extending pole fingers to suppress pole finger vibrations.

2. A rotor for a dynamoelectric machine comprising, a rotor shaft, a first pole member secured to said shaft having axially extending pole fingers, a second pole member secured to said shaft having axially extending fingers interleaved in opposing relationship to the pole fingers of said first pole member, the pole fingers of said first and second pole members being provided with pole tip extending portions, and a pair of dampener bands of non-magnetic material circumferentially engaging the outer surfaces of said tip extending portions of one pole member and the inner surface of an adjacent pole finger of the other pole member.

3. A rotor for a dynamoelectric machine comprising, a rotor shaft, first and second pole members having axially extending interleaved pole fingers, said first and second pole members being supported by and rotatable with said shaft, each of said fingers including end portions including an arcuate edge surface and a projecting part having an arcuate circumferential surface extending from said edge surface, first and second continuous wire members of a non-magnetic material, said first and second wire members engaging the inner surface of one pole member and tightly extending over the projecting part circumferential surface and being cammed around the arcuate pole edge of an adjacent pole finger, said first and second wire members stressing each pole finger radially inward at the finger end portions and wedging outwardly against the inner pole surfaces.

4. A rotor for a dynamoelectric machine comprising, a rotor shaft, first and second pole members having radially extending pole end portions with axially extending pole fingers, said pole fingers being interleaved in circumferentially spaced relationship, said first and second pole end portions being supported by and rotatable with said shaft, first and second wire bands having substantially circular cross sections and formed of a non-magnetic metal material each of said pole fingers including end portions formed by an arcuate end surface and an axially extending pole tip portion having a radial surface arcuately extending along a lower portion of said end surface to form an outer circumferential area for receiving one of said first and second wire bands, each of said pole fingers further including an inclined portion extending at a predetermined angle from an inner finger portion to a pole end portion to form an inner circumferential area for engaging by one of said first and second wire bands, said first and second wire bands each being stressed over said radial tip surface and around said end surface of each finger of one pole member and in wedging engagement with the inclined portion under an adjacent finger of the other pole member to dampen vibrations by restraining rotational deflections in said fingers.

5. The rotor according to claim 4, wherein each of said first and second wire bands includes a continuous band of stainless steel wire.

6. The rotor according to claim 5 wherein said first and second wire bands are welded to each end portion of said pole fingers.

References Cited

UNITED STATES PATENTS

| | | | |
|---|---|---|---|
| 3,051,859 | 8/1962 | Farrell | 310—263 X |
| 3,134,039 | 5/1964 | Bosch | 310—263 X |
| 3,230,404 | 1/1966 | Graham | 310—51 |
| 3,252,025 | 5/1966 | Brown et al. | 310—263 X |
| 3,271,606 | 9/1966 | Collins | 310—263 |

WARREN E. RAY, *Primary Examiner.*

U.S. Cl. X.R.

310—183, 192, 263